United States Patent
Singleton et al.

[11] Patent Number: 5,341,298
[45] Date of Patent: Aug. 23, 1994

[54] THROTTLE TRACTION CONTROL FOR AUTOMOTIVE VEHICLE

[75] Inventors: William A. Singleton, Grafton; Robert D. Burns, North Royalton, both of Ohio

[73] Assignee: Allied-Signal Inc., Morristown, N.J.

[21] Appl. No.: 934,607

[22] Filed: Aug. 25, 1992

[51] Int. Cl.⁵ .................................. B60T 8/32
[52] U.S. Cl. .................. 364/426.02; 303/97; 303/106; 180/197
[58] Field of Search ............ 364/426.02, 426.03; 180/197; 123/333, 481, 493; 303/97, 106

[56] References Cited

U.S. PATENT DOCUMENTS

| | | | |
|---|---|---|---|
| 4,583,611 | 4/1986 | Frank et al. | 180/197 |
| 4,760,893 | 8/1988 | Sigl et al. | 364/426.02 |
| 4,766,972 | 8/1988 | Takata et al. | 180/197 |
| 4,811,808 | 3/1989 | Matsumoto et al. | 364/426.01 |
| 4,939,656 | 7/1990 | Hoashi et al. | 364/426.02 |
| 4,955,448 | 9/1990 | Ise et al. | 364/426.02 |
| 4,976,330 | 12/1990 | Matsumoto | 180/197 |
| 5,002,148 | 3/1991 | Miyake et al. | 364/426.03 |
| 5,009,294 | 4/1991 | Ghoneim | 364/426.03 |
| 5,014,202 | 5/1991 | Thatcher | 364/426.03 |
| 5,040,120 | 8/1991 | Hoffmann | 364/426.03 |
| 5,058,699 | 10/1991 | Fennel et al. | 180/197 |
| 5,115,395 | 5/1992 | Petzold | 364/424.1 |

FOREIGN PATENT DOCUMENTS

| | | |
|---|---|---|
| 0298232 | 1/1989 | European Pat. Off. . |
| 0485779 | 5/1992 | European Pat. Off. . |
| 0486878 | 5/1992 | European Pat. Off. . |
| 3924604 | 2/1990 | Fed. Rep. of Germany . |

*Primary Examiner*—Thomas G. Black
*Assistant Examiner*—Tyrone V. Walker
*Attorney, Agent, or Firm*—Ken C. Decker

[57] ABSTRACT

An engine traction control system generates a control cycle of a varying duty cycle which controls the pressure level in a pneumatic actuator in the engine power control linkage to thereby reduce engine power when the driven wheels begin slipping during the vehicle acceleration. The duty cycle is set as a function of wheel speed error between the average wheel speeds of the driven and non-driven wheels, and also as a function of the change in the error between calculation cycles.

14 Claims, 4 Drawing Sheets

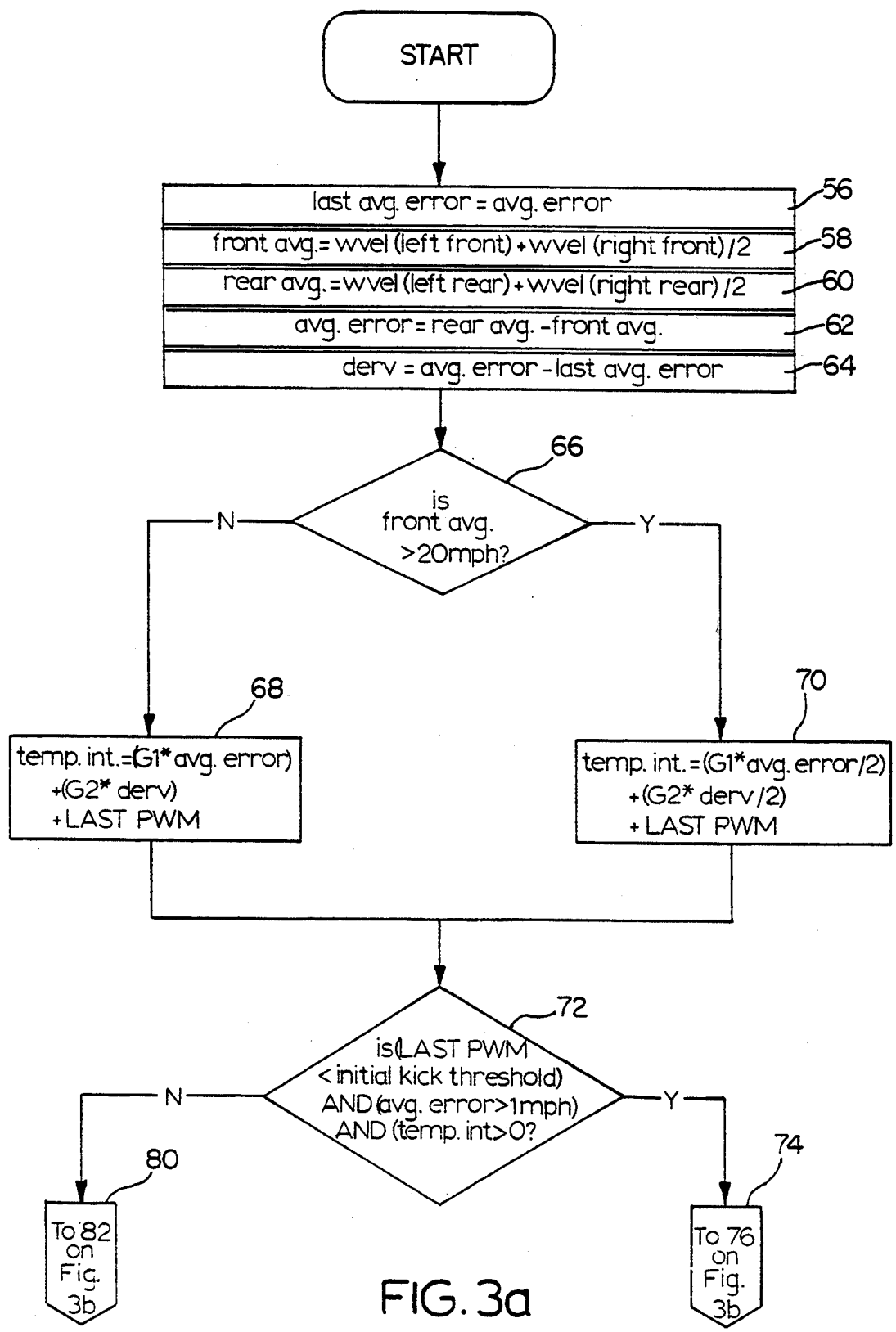

THROTTLE TRACTION CONTROL FOR AUTOMOTIVE VEHICLE

This invention relates to an engine traction control system in which the power of the engine is reduced when the vehicle is accelerated and the driven wheels of the vehicle begin slipping.

Prior art traction control systems are known in which, upon slipping of one of the driven wheels of the vehicle during vehicle acceleration, the power output generated by the engine is controlled to less than that demanded by the vehicle operator and in which the brake controlling the slipping wheel. While two separate controls are involved (engine throttle and braking), prior art systems provided interactions between the throttle and brake controls so that inconsistent performance was realized. Furthermore, the control of the engine throttle in prior art systems is unrelated to wheel speed. In prior art systems, the throttle is reduced by a predetermined amount, or the throttle is reduced by an amount that is dependent upon some other variable, such as the braking pressure being applied by the brake control. A typical prior art system is disclosed in U.S. Pat. No. 4,955,448. As used herein, the term "throttle" or "throttle control" is used in its broadest possible sense, and includes, for example, control of a fuel management system for the engine, and is not limited to control of a throttle valve in a carbureted engine.

The present invention provides a throttle control which is completely independent of any brake traction control which may be used on the vehicle, thus eliminating interaction between the controls and obtaining more consistent and smoother performance than prior art traction control systems. Furthermore, the present invention controls the engine throttle as a function of the average wheel speeds of the driven wheels of the vehicle and as a function of the change in average wheel speeds. This provides a throttle control that is directly responsive to wheel slippage, and provides smooth, continuously varying control, thereby eliminating the harshness often realized in prior art controls.

These and other advantages will become apparent from the following description, with reference to the accompanying drawings, in which:

FIGS. 3a, 3b, and 3c are schematic logic diagrams illustrating the manner in which the control system of the present invention functions.

Figure 1:
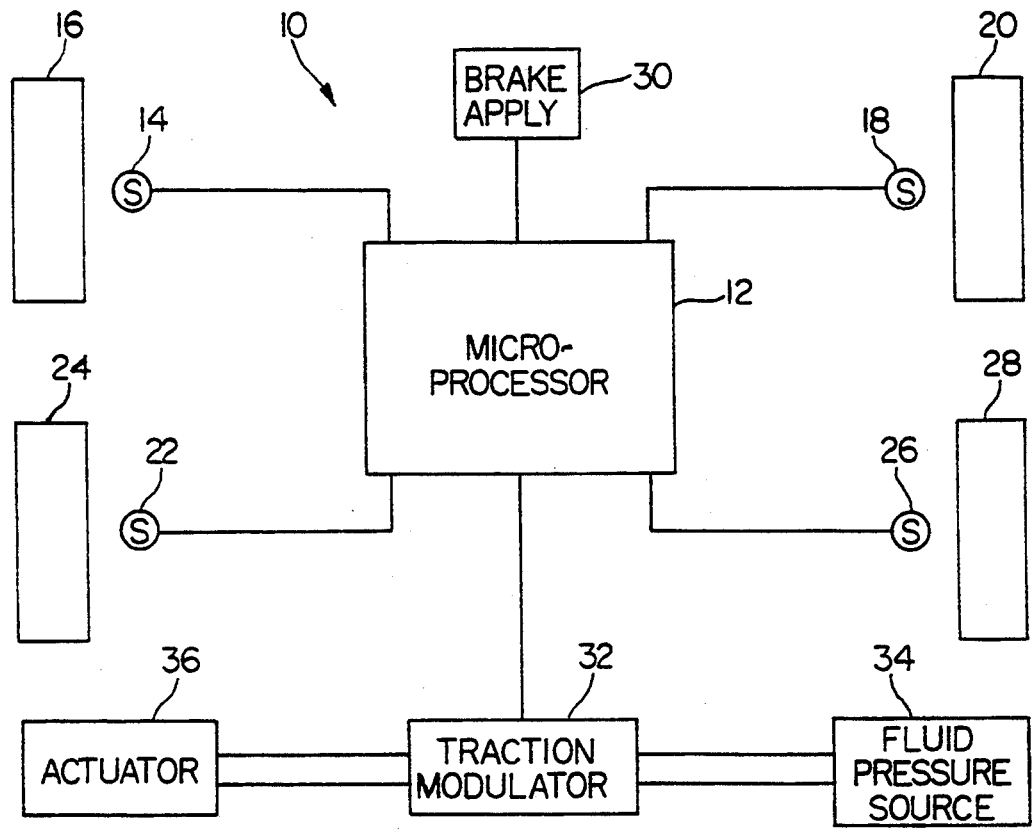
FIG. 1 is an overall system schematic of a throttle traction control system pursuant to the present invention.

Referring now to FIG. 1 of the drawings, the traction control system according to the present invention is generally indicated by the numeral 10 in FIG. 1. System 10 includes a microprocessor 12 which receives wheel speed signals generated by a wheel speed sensor 14, which generates a signal which varies in response to rotation of the left front wheel of the vehicle 16; a speed sensor 18, which generates a signal which varies in accordance with the rotation of the right front wheel of the vehicle 20; a third speed sensor 22, which generates a signal which varies in accordance with the rotation of the left rear wheel of the vehicle 24; and a fourth speed sensor 26, which generates a signal which varies in accordance with the rotation of the right rear wheel 28 of the vehicle. Although the invention is equally applicable to front wheel drive vehicles, for the purposes of the following it is assumed that the front wheels 16, 20 of the vehicle are the non-driven wheels and that the rear wheels 24, 28 are the driven wheels. A brake apply signal generator generally indicated by the numeral 30 transmits a brake apply signal to the microprocessor 12. The brake apply signal generator 30 may either be a pressure sensor connected in the lines of the brakes (not shown) controlling one or more of the wheels 16, 20, 24 or 28, or the brake apply signal may be the vehicle stoplight switch. As will be described in detail hereinafter, the microprocessor 12 processes the speed signals received from sensor 14, 18, 22 and 26 and, if a driven wheel slippage condition is established, the microprocessor 12 generates a control signal which is transmitted to a solenoid actuated traction modulator 32.

The traction control modulator 32 is of conventional design, and includes a solenoid valve (not shown) which may be pulsed rapidly to control fluid communication from a regulated fluid pressure source 34 to a fluid pressure responsive actuator 36 in the vehicle throttle or engine power control linkage, as will be hereinafter described. The solenoid valve comprising the traction control modulator 32 is pulsed at a variable duty cycle to thereby generate a variable pressure level in the actuator 36 from the substantially constant pressure of the regulated fluid pressure source 34. The microprocessor 12 includes a duty cycle generator which generates a pulse width modulated (PWM) signal which is the control signal transmitted to the traction modulator 32. The duty cycle of the control signal is varied in accordance with the desired pressure in actuator 36 calculated by the microprocessor 12 to prevent spinning of the rear wheels 24, 28 during engine acceleration. Such duty cycle generators are well known to those skilled in the art. The traction modulator 32 responds to the duty cycle of the control signal to vary the pressure in the actuator 36.

Figure 2:
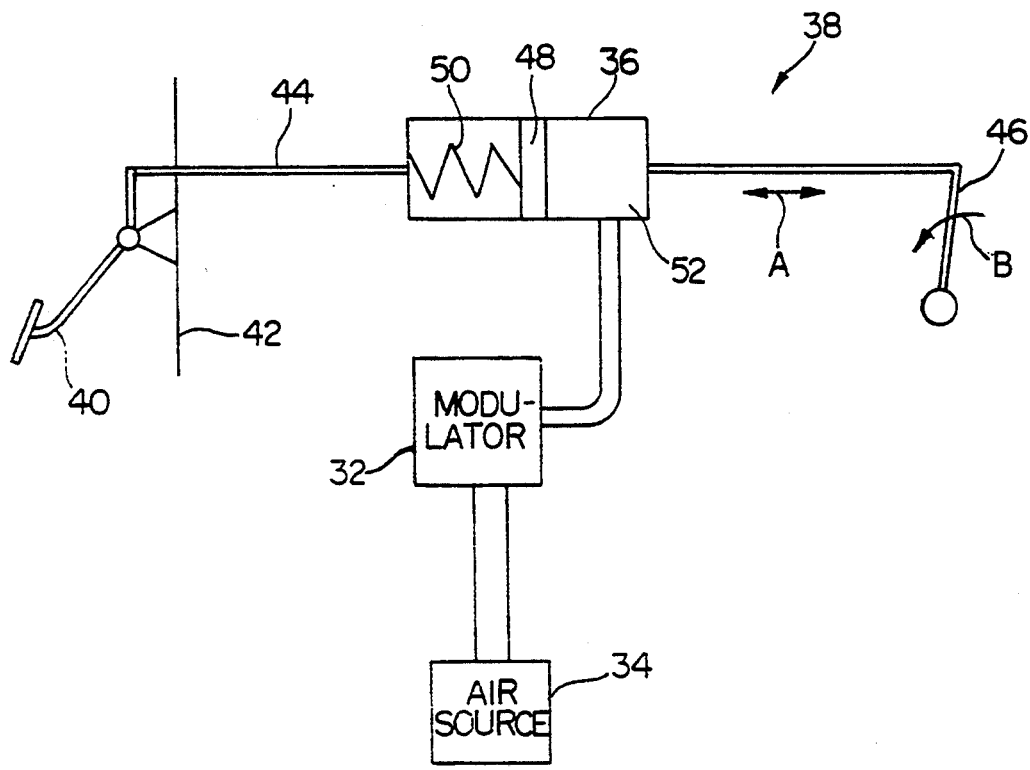
FIG. 2 is a schematic of the engine throttle or control linkage which is controlled by the system of the present invention.

Referring now to FIG. 2, the engine throttle control or power control linkage system generally indicated by the numeral 38 includes an accelerator pedal 40 mounted in the vehicle operator's compartment on the vehicle fire wall 42. A linkage 44 extends through the fire wall 42 and carries the actuator 36, which is movable with the linkage 44 in the directions indicated by the arrows A. Movement of the actuator 36 with the linkage 44 controls the engine throttle or power control lever 46. If the lever 46 is rotated in the direction of the arrow B, engine power is increased. The modulator 32 and air source 34 are, of course, mounted on a fixed portion of the vehicle. As described above, the modulator responds to the control pulse with modulated control signal generated by microprocessor 12 to control the fluid pressure level in the actuator 36, in opposition to piston 48 to which the left hand section of linkage 44 is mounted. A spring 50 biases the piston 48 to a predetermined position in the actuator when the pressure level in actuator 36 is low.

Duty cycles are normally expressed as a percentage by those skilled in the art. For example, a 100% duty cycle means that the solenoid valve within modulator 32 is actuated continually, whereas a 0% duty cycle means that the solenoid valve comprising the modulator 32 is turned off. As can be seen, as the pressure level within the pressure section 52 of the actuator 36 increases, the linkage 44 is effectively lengthened, thereby rotating the power control lever 46 in the direction opposite of that indicated by arrow B, toward the idle position. For example, if the duty cycle of the modulator 32 is 15% or below, the pressure in section 52 of actuator 36 is insufficient to collapse the spring 50, so that the linkage 44 is unaffected and the position of the lever 46 is controlled by the vehicle operator manipulating accelerator pedal 40. On the other hand, if the duty cycle of the modulator 32 is at 30% or above, the lever 46 will be rotated to the engine idle position, regardless of the position of the accelerator pedal 40. At duty cycles between 15% and 30%, the spring 50 will be collapsed by a progressive amount, so that the position of the lever 46, and therefore the power output of the engine, will be a predetermined fraction of the power called for by the vehicle operator in depressing the accelerator pedal 40.

The manner in which the microprocessor 12 determines a wheel slippage condition and calculates the control signal actuating the traction modulator 32 will now be described in detail. The microprocessor 12 receives information from each of the wheel speed sensors and processes the information according to the program illustrated in FIGS. 3a, 3b and 3c once every 15 milliseconds. Accordingly, the duty cycle of the control signal actuating the traction modulator 32 can be changed every 15 milliseconds, thereby assuring substantially continuous function actuation of the traction modulator 32.

Figure 3B:
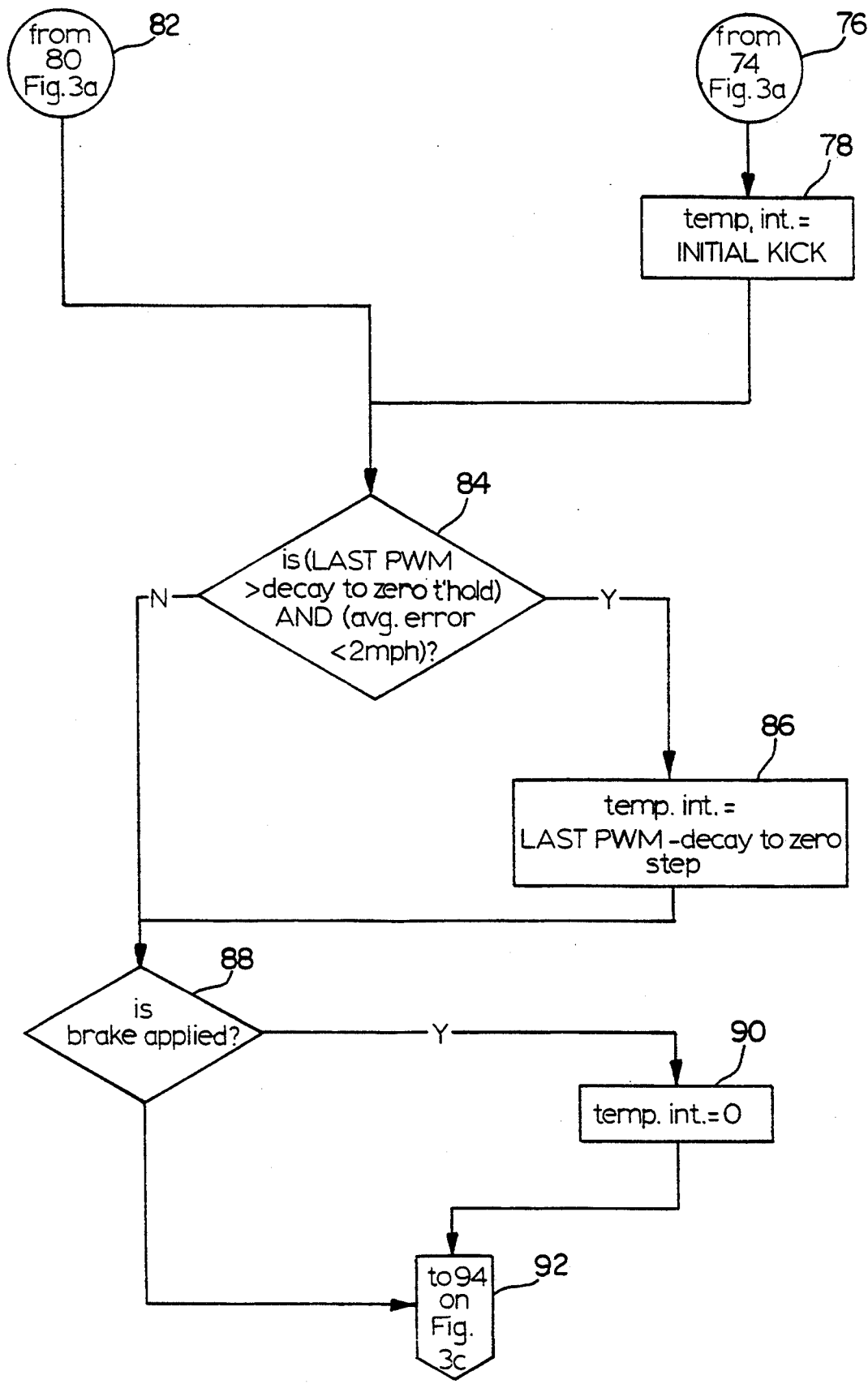
Figure 3C:
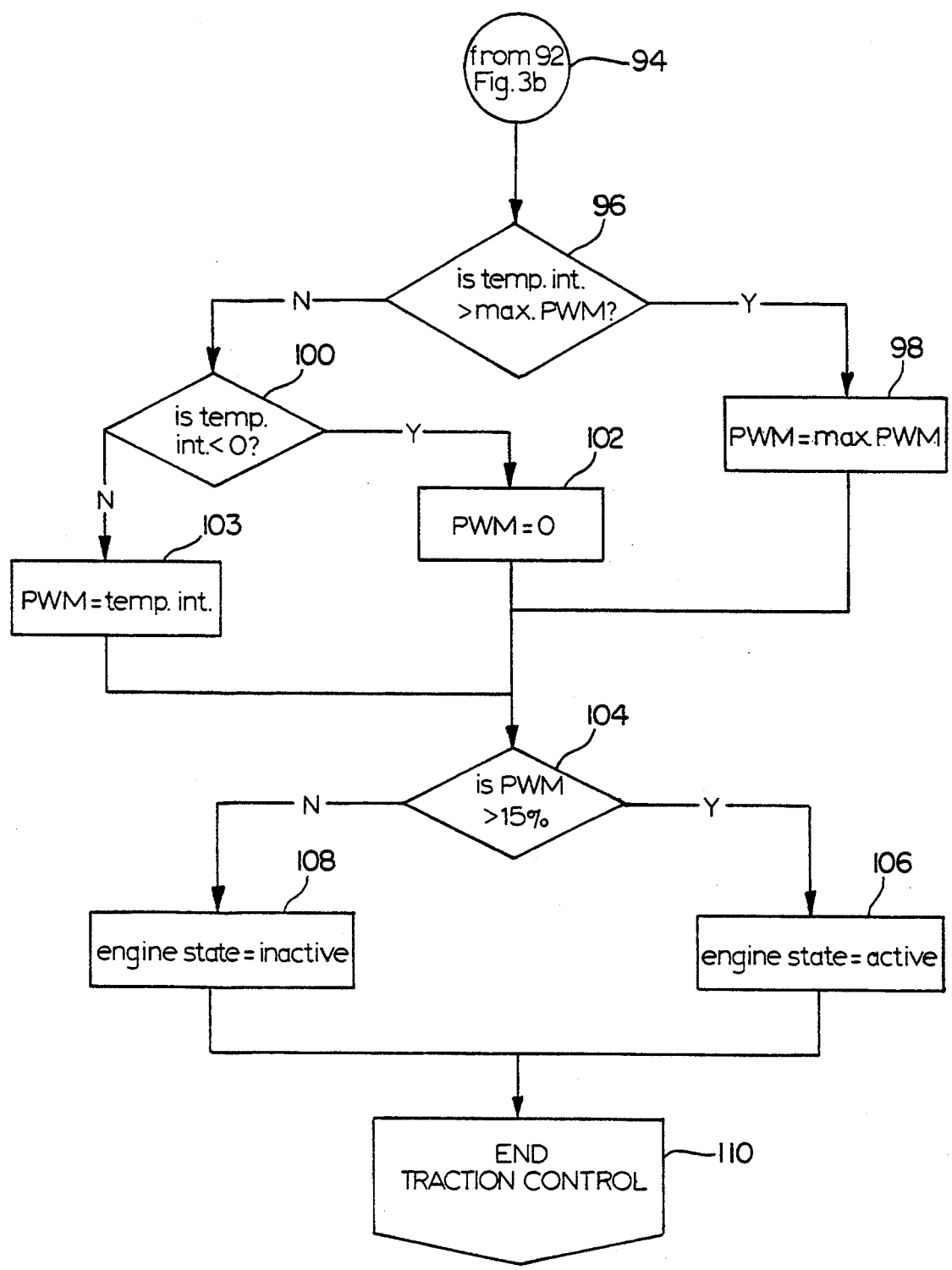

Referring now to the diagrams in FIGS. 3a, 3b, and 3c, the engine control routine started as indicated at 54. The program then proceeds to set the quantity LAST AVERAGE ERROR equal to AVERAGE ERROR, as indicated at 56. The quantity average error is calculated in box 62 hereinbelow as will hereinafter be described. In other words, the last average error, that is, the average error calculated during the last pass through the program, is saved to be used in calculating the change in error between the preceding cycle and the current cycle, as performed at 64 hereinbelow. The program then calculates the variable FRONT AVERAGE as being equal to the average of the wheel velocity of the left front wheel and the wheel velocity of the right front wheel. Since the front wheels are assumed to be the non-driven wheels of the vehicle, this quantity will also approximate actual vehicle speed. The program then continues to calculate the quantity REAR AVERAGE, as indicated at 60, which is the average of the wheel velocity of the left rear wheels and the wheel velocity of the right rear wheels. Of course, at both 58 and 60, the program uses the wheel speed signals generated by the sensors 14, 18, 22, and 26. These sensors generate analog signals, which are digitized within the microprocessor 12. The program then calculates the term AVG ERROR, or average error, as being equal to the difference between the rear average calculated at 60 and the front average as calculated at 58, all as indicated at 62 in FIG. 3a. The program then calculates the term DERV, which is the difference between the errors calculated at 62 in the present cycle and the error calculated during the last pass through the program as indicated at 64.

The program then tests whether FRONT AVG, the average speed of the non-driven wheels, which will also be substantially equal to vehicle speed, is greater than 20 mph, as indicated at 66. If vehicle speed is less than 20 mph, the program then calculates of the variable TEMP INT, which is the temporary value of the pulse modulation or PWM control signal that will be used to actuate the modulator 32. TEMP INT is calculated as equal to the coefficient G1 times AVG ERROR (the difference between the average speeds of the front and rear wheels) plus the coefficient G2 times DERV (the difference between the average errors between the last pass and the current pass through the program) plus LAST PWM, the value of the PWM control signal calculated during the last pass through the program. The calculation is indicated at 68 in FIG. 3a. A typical value of the coefficients G1 is 0.0358 and a typical value for the variable G2 is 0.588, although these coefficients must be tailored for the specific vehicle upon which the system is used. In other words, for an error of 10 mph between the average speeds of the front and rear wheels, the duty cycle will be changed by 0.358%, and for a 1g change in DERV, the duty cycle will be changed by 0.588%. Accordingly, if LAST PWM, the duty cycle of the control signal during the last pass through the program, is 20%, the new duty cycle will be 20.358% for an error of 10 mph, and will be increased an additional 0.588%, to 20.946%, if the value of DERV is 1 g. If the vehicle speed, which is assumed to be equal to the average speed of the non-driven front wheels, exceeds 20 mph as tested at 66 in FIG. 3a, the coefficient G1 and G2 are cut in half when the calculation of TEMP INT is made, as indicated at 70 in FIG. 3a. For stability, above 20 mph, it is desirable that the system respond more slowly to wheel spin.

After TEMP INT is calculated, the program then tests, as indicated at 72, to determine if the value of LAST PWM, the duty cycle of the control signal calculated during the last pass through the program, is less than an initial kick threshold, which is set equal to a 10% duty cycle. If the last PWM is less than the initial kick threshold, and if AVG ERROR, the error between the average speeds of the front and rear wheels, exceeds 1 mph, and if the value of TEMP INT is greater than zero, the program branches, as indicated at 74 on FIG. 3a, to entry 76 on FIG. 3b. The value of TEMP INT is then set equal to the initial kick of a 10% duty cycle, as indicated at 78 in FIG. 3b. If the test made at 72 in FIG. 3a is negative, the program branches, as indicated at 80 in FIG. 3b, to entry 82 in FIG. 3b. The program then continues to test as to whether LAST PWM, the duty cycle of the control signal calculated during the last pass through the cycle, is greater than a predetermined decay to zero threshold and the error between the average speeds of the front and rear wheels is less than 2 mph, it is desirable to terminate traction control and smoothly return control of the engine to the driver. This test is made at 84 in FIG. 3b. If traction control is to be terminated, the value of TEMP INT, as determined at 86 in FIG. 3b, is set equal to LAST PWM, less a predetermined decay to zero step. A typical decay to zero threshold of the value of the last duty cycle used during the test at 84 is 1.4% duty cycle and the step decrease used in the calculation at 86 is typically 0.028% duty cycle, although these values will vary depending upon the vehicle. In other words, if the duty cycle during the last pass through the program is greater than 1.4%, and the error between the average speeds of the driven and non-driven wheels is less than 2 mph, the duty cycle of the control signal is reduced by 0.028 every pass through the program, or every 15 milliseconds.

The program then tests to determine if the brake is applied, as indicated at 88, by interrogating the signal generated by the brake apply sensor 30. If the brakes are applied, the value of the TEMP INT is set equal to zero, as indicated at 90 in FIG. 3b. Clearly, if the brakes are applied, traction control is unnecessary and undesirable. As indicated at 92, the program then branches to entry 94 on FIG. 3c.

Referring to FIG. 3c, the program tests at 96 to determine whether the value of TEMP INT is greater than a predetermined maximum PWM, a predetermined maximum duty cycle of the control signal. As discussed above, a duty cycle of 30% or greater corresponds to engine idle, so it is undesirable for the value of the duty cycle to exceed 30%. If the calculated value of TEMP INT exceeds a 30% duty cycle (again, the maximum duty cycle is vehicle dependent), the value of the duty cycle PWM is set equal to the maximum value, for example, a 30% duty cycle, as indicated at 98 in FIG. 3c. If the calculated value of TEMP INT is less than the maximum duty cycle, the program tests at 100 to determine if the value of TEMP INT is less than zero. If the calculated value of TEMP INT is less than zero, the duty cycle of the control signal, as indicated at 102, is set equal to zero. If TEMP INT is greater than zero, the value of the duty cycle of the control signal is set equal to TEMP INT, as indicated at 102. This is the duty cycle that will be used to control the actuator 36 until the next calculation is made 15 milliseconds later.

Vehicles equipped with traction control are also normally equipped with a traction active indicating light on the dashboard of the vehicle. At very low duty cycles of below 15% the engine is still under direct control of the vehicle operator, as discussed above. Accordingly, it is not desirable to actuate the light unless the calculated duty cycle is above 15%. Accordingly, as indicated at 104 in FIG. 3c, a test is made to determine if the duty cycle is greater than the system active threshold. This system active threshold is set at the aforementioned 15%, although this variable is also vehicle dependent. If the duty cycle is above the threshold, the engine state is declared active as indicated at 106. If the duty cycle is below the threshold, the engine traction state is declared inactive, as indicated at 108. The determination of the engine traction control as being active or inactive as made at 106 and 108 is used only to control the traction active warning light on the vehicle dashboard and is not used in the calculation of the duty cycle for the control signal. The declaration of the engine traction control being active or inactive may also be used in the aforementioned wheel traction control system, such systems may set different values if the engine traction state is active instead of inactive. The program then ends as indicated at 110.

We claim:

1. Method of controlling wheel slippage upon acceleration of a motor vehicle having an engine controlled by a power control, said vehicle having driven wheels driven by said engine and nondriven wheels, comprising the steps of generating wheel speed signals representing the wheel speeds of the wheels of the vehicle, determining a wheel slippage condition of at least one of said wheels from said wheel speed signals in response to slipping of a wheel of the vehicle, and calculating a control signal controlling the power control of the engine to a controlled level less than the level established by the vehicle operator in response to the wheel slippage condition, calculating a driven wheel average wheel speed variable equal to the average wheel speeds of said driven wheels, calculating a nondriven wheel average wheel speed variable equal to the average wheel speeds of the nondriven wheel, calculating an error variable equal to the difference between the driven wheel average wheel speed signal and the nondriven wheel average wheel speed signal, recalculating said error variable during each of successive time periods, calculating a difference variable equal to the difference between the error variables calculated in successive time periods, and recalculating said control signal in each of said successive time periods as a function of the error variable and the difference variable.

2. Method of controlling wheel slippage as claimed in claim 1, wherein said method includes the step of setting a predetermined value of said control signal if the value of the control signal is less than the predetermined value.

3. Method of controlling wheel slippage as claimed in claim 1, wherein said control signal is a pulse width modulated signal.

4. Method of controlling wheel slippage as claimed in claim 1, wherein said control signal is calculated by applying a first gain factor to said error variable and a second gain factor to the change in said difference variable.

5. Method of controlling wheel slippage as claimed in claim 4, wherein said method includes the step of modifying at least one of said gain factors if the nondriven wheel average wheel speed variable represents a speed above a predetermined level.

6. Method of controlling wheel slippage as claimed in claim 1, wherein said method includes the step of decreasing the value of said control signal incrementally when the value of the control signal drops below a predetermined threshold.

7. Method of controlling wheel slippage as claimed in claim 1, wherein said control signal is increased and decreased as the error variable and the difference variable is increased and decreased.

8. System for controlling wheel slippage upon acceleration of a motor vehicle having driven and nondriven wheels and an engine controlled by a power control controlled by the vehicle operator comprising wheel speed generating means for generating wheel speed signals representing wheel speeds of the wheels of the vehicle, calculation means responsive to said wheel speed signals for detecting a wheel slippage condition upon acceleration of the vehicle and generating a control signal in response thereto, and actuating means responsive to said control signal for adjusting said power control in response to the wheel slippage condition, said calculation means including means for calculating a driven wheel average wheel speed variable equal to the average wheel speeds of said driven wheels, means for calculating a nondriven wheel average wheel speed variable equal to the average wheel speeds of the nondriven wheel, means for calculating an error variable equal to the difference between the driven wheel average wheel speed signal and the nondriven wheel average wheel speed signal, means for recalculating said error variable during each of successive time periods, means for calculating a difference variable equal to the difference between the error variables calculated in successive time periods, and means for recalculating said control signal in each of said successive time period as a function of the error variable and the difference variable.

9. System for controlling wheel slippage as claimed in claim 8, wherein an actuating linkage operated by the vehicle operator controls said power control, said actuating linkage including an actuator responsive to said control signal for regulating said linkage in response thereto to thereby override the vehicle operator during said wheel slippage condition.

10. System for controlling wheel slippage as claimed in claim 9, wherein said actuator is a pressure responsive actuator, and a modulator responsive to said control signal to control communication of pressure to said actuator.

11. System for controlling wheel slippage as claimed in claim 8, wherein control signal calculating means includes means for setting a predetermined value of said control signal if the value of the control signal is less than a predetermined value.

12. System for controlling wheel slippage as claimed in claim 8, wherein control signal calculating means includes means for modifying said control signal when the nondriven wheel average wheel speed variable exceeds a predetermined level.

13. System for controlling wheel slippage as claimed in claim 8, wherein control signal calculating means includes means for applying a first gain factor to said error variable and a second gain factor to the difference variable.

14. System for controlling wheel slippage as claimed in claim 13, wherein said control signal calculating means includes means for modifying at least one of said gain factors when the nondriven wheel average wheel speed variable exceeds a predetermined level.

* * * * *